UNITED STATES PATENT OFFICE.

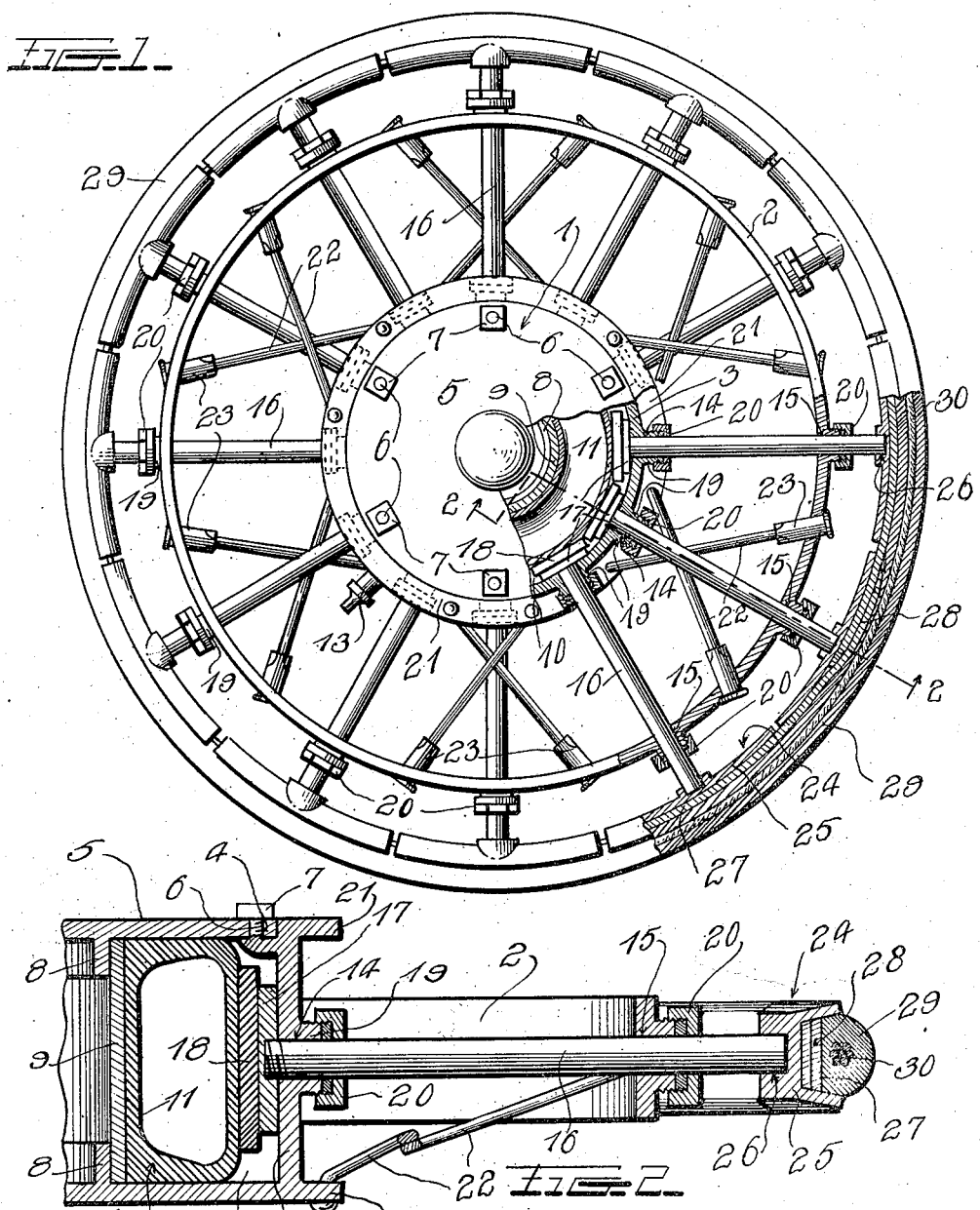

JAMES A. KOLBY, LOUIS P. LARSEN, AND CHRISTIAN P. NEILSEN, OF EPHRAIM, UTAH, ASSIGNORS TO KOLBY WHEEL COMPANY, INC., OF EPHRAIM, UTAH.

RESILIENT WHEEL.

1,191,901. Specification of Letters Patent. Patented July 18, 1916.

Application filed April 24, 1916. Serial No. 93,204.

*To all whom it may concern:*

Be it known that we, JAMES A. KOLBY, LOUIS P. LARSEN, and CHRISTIAN P. NEILSEN, citizens of the United States, residing at Ephraim, in the county of Sanpete and State of Utah, have invented certain new and useful Improvements in Resilient Wheels; and we do declare the following to be a full, clear, and exact description of the invention, such as will enable others skilled in the art to which it appertains to make and use the same.

This invention relates to improvements in resilient vehicle wheels, particularly those that have a pneumatic cushion surrounding the hub which is acted upon by a plurality of radiallly extending plungers upon the outer ends of which a flexible arm is secured.

The principal object of the present invention is to improve upon the resilient wheel shown in our application for Letters-Patent filed September 13, 1915, Serial No. 50,471, and provide a wheel which will be considerably lighter, yet stronger than that illustrated, and also to provide a new way of constructing the pneumatic cushion and its coöperating parts.

With the above and other objects in view, our invention resides in the novel features of construction, combination and arrangement of parts which will hereinafter be more particularly described and claimed.

In the accompanying drawing: Figure 1 represents a side elevation of a wheel constructed in accordance with our invention, showing parts of the same broken away and in section; and Fig. 2 is a transverse section taken on the line 2—2 of Fig. 1.

Referring more particularly to the drawing, 1 designates a casing through the center of which an opening is formed to receive the axle of the vehicle, and 2 indicates a one-piece rim which surrounds and is spaced from the casing 1. The casing is formed with an outer annular side 3, one edge of which is integrally united with the inner upright wall thereof while its outer edge has similarly connected therewith an inwardly extending flange 4 which is spaced inwardly as illustrated to form a seat for the closure of the casing which is in the form of a circular plate 5. The flange 4 is provided with a number of outwardly extending threaded lugs 6 which extend through apertures in the plate 5 and receive nuts 7 so that said plate may be secured in position. The inner sides of the upright walls of the casing, one of which is formed by the plate 5, are provided with inwardly extending annular flanges 8 which are spaced from the opening through which the axle of the vehicle extends, and form stops for a ring 9, said ring forming the inner side of an annular chamber 10.

Within the chamber 10 is disposed an annular pneumatic cushion 11 which is rectangular in cross section and has its inner corners at the inter-section of the upright walls and the inner annular side, enlarged as shown at 12. This prevents the cushion from being cut as would probably occur, when the same was inflated, by portions thereof being forced into the corners of the annular chamber. The pneumatic cushion may be readily inflated through the valve stem 13 which extends through an opening in the annular portion 3 of the casing 1.

The annular portion 3 is provided with a plurality of openings 14 which are alined with apertures 15 in the rim 2, said alined openings and apertures slidably receiving the plungers 16, the outer ends of which extend beyond said rim while the inner ends are each provided with a rectangular head 17. Said heads are disposed within the chamber 10 and each have a rectangular cushioning member 18 fixed thereto and resting upon the outer portion of the pneumatic cushion 11. Each cushioning member 18 which is preferably of soft rubber or similar material is considerably larger than the head 17 so that the pneumatic cushion will not be cut when the plungers 16 force their heads inwardly. The openings 14 and the apertures 15 each have a threaded nipple 19 surrounding the same and extending outwardly which are adapted to receive the packing glands 20, thereby forming stuffing boxes. The stuffing boxes on the casing 1 prevent water from entering the chamber 10 and rotting the pneumatic cushion, and those on the rim 2 are used to more effectively guide the plungers during their movement.

The upright walls of the casing 1 are extended radially outward to form the annular flanges 21. A number of pairs of tangentially arranged crossed spokes 22 connect the rim 2 with the casing 1, the inner ends of the spokes being secured to the annular flanges 21, while their outer ends are adjustably mounted in the rim 2. It will be noted that a pair of these spokes are disposed adjacent every other one of the plungers 16, and that the alternate pairs are attached to the opposite flanges 21. In other words, one pair of spokes has its lower ends secured in the outer flange 21, while the next pair is attached to the inner flange and so on. The tension of the spokes, which are of heavy wire, is readily varied by rotation of the tightening caps 23 in the proper direction as is usual in a device of this character. This construction, it will be seen, provides an extremely simple and light wheel, but one which will be exceptionally strong and able to withstand extremely rough usage.

Around the one-piece rigid rim 2 is disposed a sectional rim 24 which is formed of a number of arcuate sections 25 substantially U-shaped in cross section, each of which is provided with an inwardly opening socket 26 in which the outer ends of the plungers 16 are disposed. The individual sections of the rim 24 are held in operative position by the spring metal band 27 which rests in the bottom of the U-shaped groove in the sections 25 and has its ends overlapped as shown at 28, said ends sliding upon each other when the diameter of the sectional rim is varied. A rubber or other resilient tire 29 is also disposed in the channel which is formed in the sectional rim. We preferably embed a number of wires 30 within the rubber tire 29 to form a strengthening core, and to also aid in holding said tire upon the sectional rim.

It is obvious that when the wheel runs over a rough place in the road, the sections 25 which are nearest the ground are forced inwardly toward the rim 2, carrying with them the plungers 16 which depress the pneumatic cushion 11 so that the shocks are readily absorbed. It will also be noted that when it is desired to place another kind of tire upon the sectional rim, or to detach some of the parts of the wheel, the pneumatic cushion is deflated, whereupon the plungers 16 may be readily forced inwardly so that the sections 25 can be removed from the outer ends thereof inasmuch as the diameter of the sectional rim is considerably reduced.

We claim:

1. A vehicle wheel comprising an annular casing, radially extending annular flanges formed adjacent the inner and outer sides thereof, an annular pneumatic cushion in said casing, a rigid rim surrounding said casing and spaced therefrom, the annular portion of said casing and said rim having a plurality of alined apertures, plungers slidable in said alined apertures, the outer ends projecting beyond said outer rim, heads on the inner ends within said casing for engagement with the pneumatic cushion, pairs of tangentially arranged spokes disposed around said casing and having their outer ends secured in said rim, the inner ends of the alternate pairs of spokes being attached to opposite flanges, the spokes of each pair being crossed and disposed on opposite sides of said plungers, a sectional rim around the first mentioned rim and formed of a plurality of arcuate sections, each being disposed on the outer end of one of said plungers, and a tire around said sectional rim.

2. A vehicle wheel comprising an annular casing having flat parallel sides, said sides being extended radially outward to form flanges, the annular portion having a plurality of openings, an annular pneumatic cushion in said casing, said cushion being rectangular in cross section and having its upright walls at their junction with the inner annular side increased in size to prevent cutting of the same, a one-piece rigid rim surrounding said casing and spaced therefrom, said rim having a plurality of apertures alined with the openings in said casing, plungers slidable in said alined openings and apertures, the outer ends projecting beyond said rim, rectangular heads on the inner ends of the plungers within the casing, a rectangular cushioning member carried by each head for engagement with said pneumatic cushion, said members being larger than said heads, pairs of tangentially arranged spokes disposed around said casing and having their outer ends secured in said rim, the inner ends of the alternate pairs of spokes being attached to opposite flanges, the spokes of each pair being crossed and disposed on opposite sides of said plungers, a sectional rim surrounding the first mentioned rim and formed of a plurality of arcuate sections, each being disposed on the outer end of one of said plungers, and a tire surrounding said sectional rim.

In testimony whereof we have hereunto set our hands in presence of two subscribing witnesses.

JAMES A. KOLBY.
LOUIS P. LARSEN.
CHRISTIAN P. NEILSEN.

Witnesses:
E. P. THOMANDER,
C. Z. BYERGO.

Copies of this patent may be obtained for five cents each, by addressing the "Commissioner of Patents, Washington, D. C."